F. C. LIMBOCKER.
SOFT TREAD HORSESHOE.
APPLICATION FILED SEPT. 12, 1907.

912,583.

Patented Feb. 16, 1909.
2 SHEETS—SHEET 1.

Witnesses

Inventor
F. C. Limbocker
By
Attorneys

F. C. LIMBOCKER.
SOFT TREAD HORSESHOE.
APPLICATION FILED SEPT. 12, 1907.
912,583.
Patented Feb. 16, 1909.
2 SHEETS—SHEET 2.
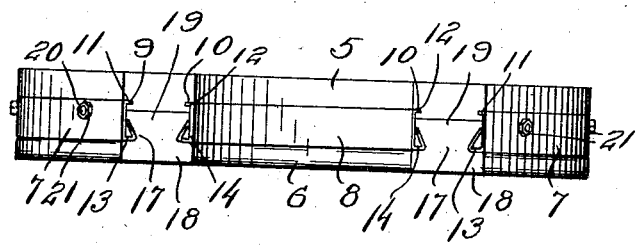
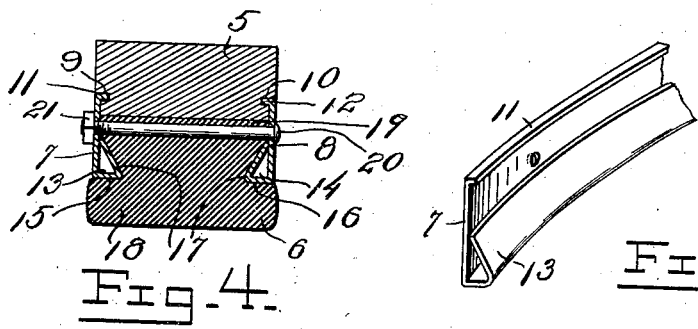

UNITED STATES PATENT OFFICE.

FREDERICK C. LIMBOCKER, OF EAST SPOKANE, WASHINGTON.

SOFT-TREAD HORSESHOE.

No. 912,583.　　　　Specification of Letters Patent.　　　　Patented Feb. 16, 1909.

Application filed September 12, 1907. Serial No. 392,555.

*To all whom it may concern:*

Be it known that I, FREDERICK C. LIMBOCKER, a citizen of the United States, residing at East Spokane, in the county of Spokane, State of Washington, have invented certain new and useful Improvements in Soft-Tread Horseshoes; and I do hereby declare the following to be a full, clear, and exact description of the invention, such as will enable others skilled in the art to which it appertains to make and use the same.

This invention relates to new and useful improvements in horseshoes and it has more particular reference to a soft tread horseshoe embodying a cushion or pad of solid rubber, the object being to provide novel means for assembling the cushion or pad upon the metallic body, whereby old worn pads may readily be removed and new ones substituted, thus avoiding the expense necessary to an entirely new shoe when the pads have become worn.

The details of construction will appear in the course of the following description in which reference is had to the accompanying drawings forming a part of this specification, like characters of reference designating similar parts throughout the several views, wherein:—

Figure 1:
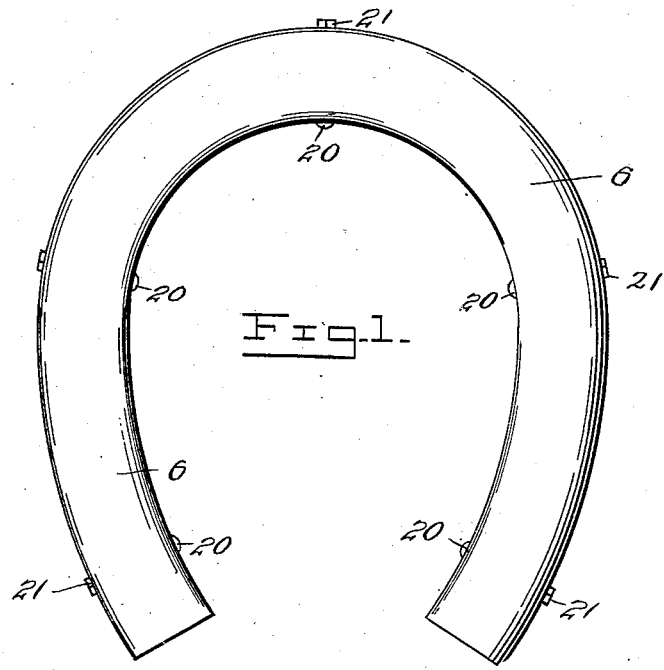
Figure 2:
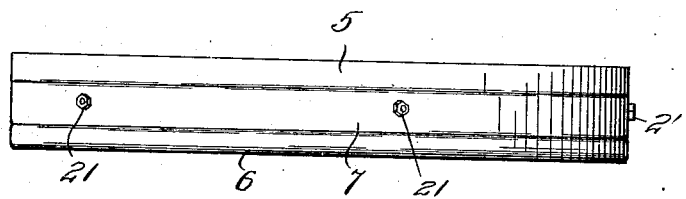

Figure 1 is a bottom plan view of the horseshoe embodying the present invention, Fig. 2 is a side elevation, Fig. 3 is a rear end elevation, Fig. 4 is a transverse section through one side of the shoe and including one of the bolts, and, Fig. 5 is a detail view of one of the side clamps.

In the accompanying drawings, the numeral 5 designates a metallic body of horseshoe shape and forming one of the component elements of the shoe, the body being constructed for attachment to the hoof in any suitable manner. The rubber cushion or rim 6 is held to the under face of the body 5 by side clamps 7 and 8 conforming to the outer and inner curved faces of the body 5. The latter is provided in its respective curved faces with longitudinal grooves 9 and 10 in which are engaged angular projections 11 and 12 formed along the upper edges of the clamps 7 and 8, the projection 11 having concave curvature throughout its extent and the projection 12 having convex curvature throughout its extent. The clamps 7 and 8 are formed at their lower ends with similarly disposed opposing rolled beads 13 and 14 which are engaged in respective grooves 15 and 16 formed in the curved faces of the cushion or rim 6, the grooves 15 and 16 forming in said cushion or rim a relatively narrow neck or web portion 17 which connects the tread portion 18 with the seating portion 19 thereof. Bolts 20 are engaged through the clamps 7 and 8 and the seating portion 19, the said bolts carrying nuts 21, which, when tightened, cause the clamps to firmly and frictionally engage the cushion or rim and likewise to fix their angular flanges 11 and 12 in the grooves 9 and 10. It is apparent that when the cushion rim 6 becomes worn so that further use is impractical the bolts 20 may be removed and a new cushion substituted.

The invention is simple in its structural details, inexpensive to manufacture and practical and efficient in use.

What is claimed, is—

A horseshoe comprising a body of horseshoe shape and containing grooves in opposite side faces thereof, a rubber cushion of corresponding shape with respect to the body and containing grooves in opposite side faces, clamp plates having inwardly projecting rolled beads formed at their lower edges and fitted within the grooves in said cushion, and further provided with inwardly projecting flanges at their upper edges fitted within the grooves in said body, and bolt fasteners securing the clamp plates to unite the body and cushions.

In testimony whereof, I affix my signature, in presence of two witnesses.

FRED. C. LIMBOCKER.

Witnesses:
　M. P. MORSE,
　J. F. BIRD.